(12) United States Patent
Serlin

(10) Patent No.: US 11,008,137 B2
(45) Date of Patent: May 18, 2021

(54) ADJUSTABLE CONTAINER

(71) Applicant: Ethan Robert Serlin, Easton, CT (US)

(72) Inventor: Ethan Robert Serlin, Easton, CT (US)

(*) Notice: Subject to any disclaimer, the term of this patent is extended or adjusted under 35 U.S.C. 154(b) by 189 days.

(21) Appl. No.: 16/357,980

(22) Filed: Mar. 19, 2019

(65) Prior Publication Data
US 2019/0344928 A1  Nov. 14, 2019

Related U.S. Application Data

(60) Provisional application No. 62/669,738, filed on May 10, 2018.

(51) Int. Cl.
*B65D 21/08* (2006.01)
*A47J 27/00* (2006.01)

(52) U.S. Cl.
CPC .......... *B65D 21/086* (2013.01); *A47J 27/002* (2013.01)

(58) Field of Classification Search
CPC .. B65D 21/086; B65D 21/083; B65D 21/041; A47J 27/002
USPC ..................................... 126/385.1; 220/573.1
See application file for complete search history.

(56) References Cited

U.S. PATENT DOCUMENTS

| | | | | |
|---|---|---|---|---|
| 685,736 A * | 10/1901 | Atwell | .................. | B65D 21/086 220/8 |
| 1,153,757 A * | 9/1915 | Brending | ............. | B65D 21/083 220/4.03 |
| 1,858,179 A * | 5/1932 | Bay | ...................... | B65D 21/086 220/8 |
| 2,546,452 A * | 3/1951 | Kmieliauskas | ........ | G10D 13/22 84/412 |
| 2,925,933 A * | 2/1960 | Watson | ................ | B65D 11/188 220/8 |
| 3,256,806 A | 6/1966 | Jordan | | |
| 3,775,809 A * | 12/1973 | Roedel | ..................... | A22C 7/00 425/338 |
| 4,178,844 A | 12/1979 | Ward et al. | | |
| 4,198,040 A | 4/1980 | Colasent | | |
| 4,624,382 A * | 11/1986 | Tontarelli | .................. | A47G 7/08 220/8 |
| 4,917,262 A | 4/1990 | Mita | | |
| 5,474,195 A * | 12/1995 | Pai | .............................. | B62J 9/00 220/4.26 |
| 6,305,567 B1 * | 10/2001 | Sulpizio | ................. | B65D 25/16 220/495.01 |
| 6,588,616 B1 * | 7/2003 | Ho | ...................... | B02C 18/0007 220/4.03 |
| 7,874,409 B1 * | 1/2011 | Lakhal | ..................... | A45C 7/00 190/105 |
| 8,006,855 B2 * | 8/2011 | Lapoint, III | ....... | B65D 88/1631 220/9.4 |

(Continued)

*Primary Examiner* — Ernesto A Grano
(74) *Attorney, Agent, or Firm* — Boudwin Intellectual Property; Daniel Boudwin

(57) ABSTRACT

An adjustable container for foods or beverages. The adjustable container includes an assembly that can be adjusted, both vertically and horizontally, to hold any of a range of different sizes, shapes, or amounts of foods or beverages. The assembly of the adjustable container can be incorporated into a pot, a pan, a bowl, a cup, a plate, or another container, for selectively controlling an area or a volume of the container. The adjustable container includes a small form factor that can be easily transported and stored in a limited space.

8 Claims, 4 Drawing Sheets

(56) References Cited

U.S. PATENT DOCUMENTS

| | | | | |
|---|---|---|---|---|
| 8,534,188 B1* | 9/2013 | Winfield | ............... | A21B 3/137 |
| | | | | 99/357 |
| 8,668,123 B2* | 3/2014 | Richmond | .............. | B60R 11/02 |
| | | | | 224/312 |
| 8,807,355 B2* | 8/2014 | Merey | .................. | A47B 57/58 |
| | | | | 211/175 |
| 8,991,640 B2* | 3/2015 | Stith | ...................... | A47J 45/06 |
| | | | | 220/573.1 |
| 10,720,130 B2* | 7/2020 | Shenhar | ................ | G10D 13/16 |
| 2003/0029080 A1* | 2/2003 | Busby | .................... | A01G 9/029 |
| | | | | 47/65.8 |
| 2005/0109654 A1 | 5/2005 | Kolar et al. | | |
| 2007/0241104 A1* | 10/2007 | Huizingh | ............ | B65D 21/086 |
| | | | | 220/8 |
| 2010/0308042 A1* | 12/2010 | Faris | ................ | B65D 51/1644 |
| | | | | 220/8 |
| 2012/0138607 A1* | 6/2012 | Mattox | ............... | B65D 21/086 |
| | | | | 220/8 |
| 2012/0248106 A1* | 10/2012 | Marta | ................ | B65D 21/086 |
| | | | | 220/8 |
| 2013/0032591 A1* | 2/2013 | Moran | ................ | A45C 7/0036 |
| | | | | 220/8 |
| 2014/0050833 A1* | 2/2014 | Stith | ...................... | A47J 36/06 |
| | | | | 426/509 |
| 2018/0118075 A1* | 5/2018 | Schultz | ................ | B60N 3/105 |
| 2019/0300223 A1* | 10/2019 | Wu | ..................... | B65D 1/0246 |

* cited by examiner

ADJUSTABLE CONTAINER

CROSS REFERENCE TO RELATED APPLICATIONS

This application claims priority under 35 U.S.C. § 119(e) to U.S. Provisional Application No. 62/669,738 filed on May 10, 2018. The above identified patent application is incorporated by reference herein in its entirety to provide continuity of disclosure.

BACKGROUND OF THE INVENTION

The present invention relates to an adjustable container for holding a variable amount of food or beverage without a use of a plurality of containers.

Many individuals use a plurality of containers for preparing, presenting, or consuming food and beverages, such as pots, pans, bowls, cups, plates, and the like, because different amounts of food may be needed in different scenarios. For example, a larger amount of food may be needed to feed a larger number of people, and a smaller amount of food may be needed to feed a smaller number of people. Further, different recipes may call for different amounts of food to be prepared using a particular type of container, and an individual must store a plurality of different sizes of each type of container to enable the individual to properly prepare, present, or consume food or beverage in these scenarios. However, many individuals have limited space in their household or workspace for storage of many differently-sized containers for foods and beverages. As a result, many of these individuals may be limited with respect to versatility in their food and beverage preparation, or may feel obligated to collect a range of differently-sized containers for their culinary requirements.

Therefore, there is a need for an adjustable container for preparing, presenting, or consuming a variable amount of food or beverage without the use of a plurality of differently-sized containers of a particular type. The present invention addresses this unmet need.

Devices have been disclosed in the art that relate to food and beverage containers. These include devices that have been patented and published in patent application publications. These devices are often not adjustable, instead having constant or relatively constant dimensions and capacities. In view of the devices disclosed in the art, it is submitted that there is a need for an improvement to existing food and beverage containers. In view of the present disclosure, it is submitted that the present invention substantially diverges in structural and functional elements from devices in the art, and substantially fulfills an unmet need.

SUMMARY OF THE INVENTION

In view of the disadvantages inherent in the known types of food and beverage containers in the art, the present invention provides a new and improved adjustable container, wherein the same can be utilized for preparing, presenting, or consuming a range of different amounts of food or beverage without the use of a plurality of differently-sized containers of a particular type.

It is therefore an object of the present invention to provide an adjustable container for preparing, presenting, or consuming a variable amount of food or beverage.

In one aspect, the invention provides an adjustable container, having a base attached to a vertically and horizontally adjustable sidewall.

In another aspect, the invention provides a horizontally telescopic sidewall, having a plurality of insert pieces and a plurality of pocket pieces. The plurality of insert pieces is configured to matingly engage with the plurality of pocket pieces in a telescopic assembly. In some embodiments, the telescopic assembly is expandable and retractable to adjust a circumference of the horizontally telescopic sidewall.

In another aspect, the invention provides a vertically telescopic sidewall, having a plurality of sections forming a telescopic assembly. In some embodiments, a height of the sidewall is increasable by sliding one or more sections of the plurality of sections of the sidewall out of one or more sections of the plurality of sections of the sidewall, and is decreasable by sliding one or more sections of the plurality of sections of the sidewall into one or more sections of the plurality of sections of the sidewall. In some embodiments, a shape of the sidewall is cylindrical.

Another object of the present invention is to provide an adjustable container, a horizontally telescopic sidewall for a container, and a vertically telescopic sidewall for a container that each may be readily manufactured from materials that permit relative economy and are commensurate with durability.

Other objects, features and advantages of the present invention will become apparent from the following detailed description, taken in conjunction with the accompanying drawings.

BRIEF DESCRIPTIONS OF THE DRAWINGS

Although the characteristic features of the invention will be particularly pointed out in the claims, exemplary embodiments of the invention and manners in which they may be made and used may be better understood after a review of the following description, taken in connection with the accompanying drawings, wherein like numeral annotations are provided throughout.

DETAILED DESCRIPTION OF THE INVENTION

Figure 1:
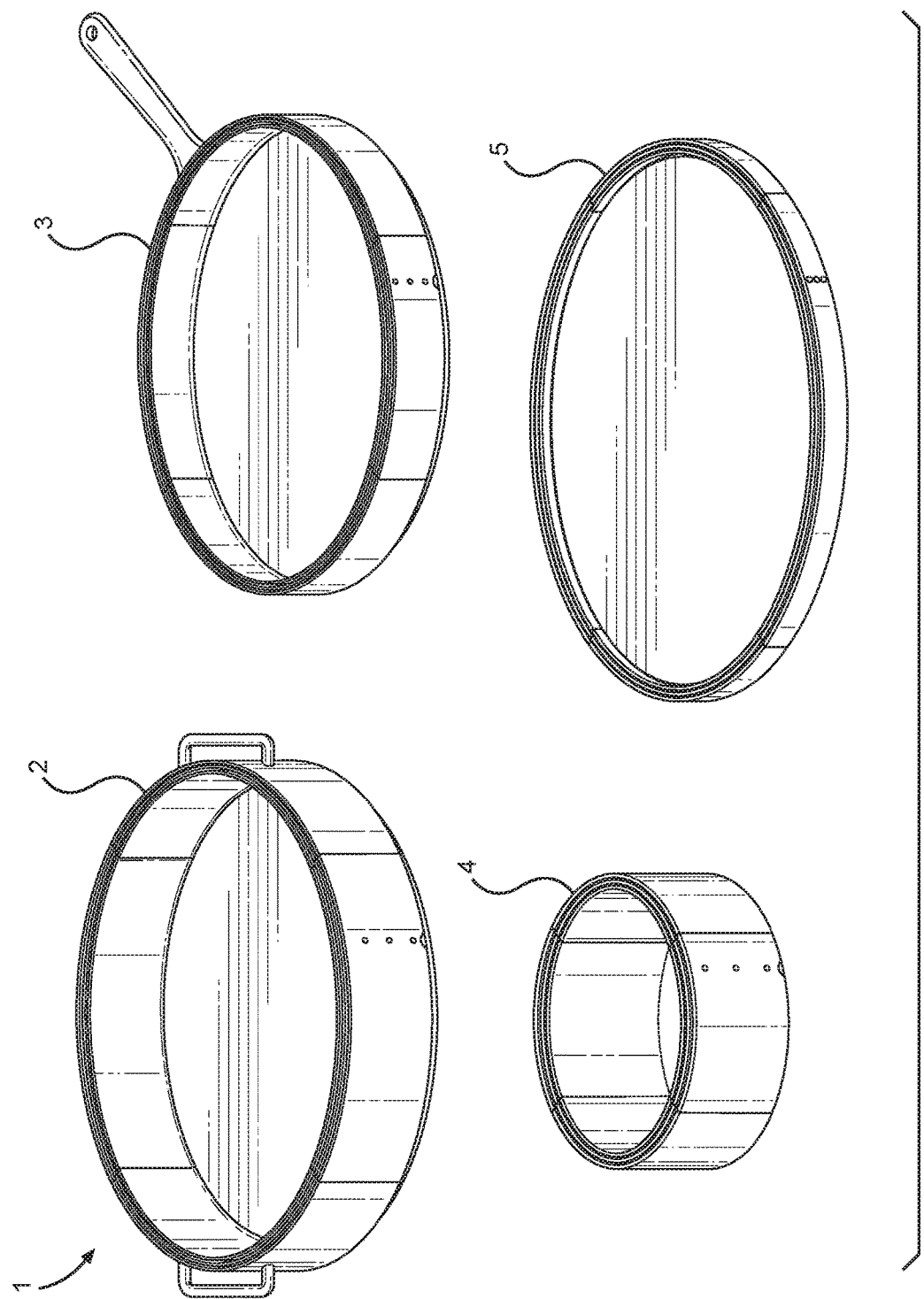
FIG. 1 depicts a perspective view of several exemplary embodiments of adjustable containers of the present invention.

Reference is made herein to the attached drawings. Like reference numerals are used throughout the drawings to depict like or similar elements of exemplary embodiments of the invention. The figures are intended for representative purposes only and should not be considered limiting in any respect.

Referring now to FIG. 1, there is depicted a perspective view of several exemplary embodiments of adjustable containers of the present invention. An adjustable container 1 may be a pot 2, a pan 3, a cup 4, a plate 5, or any other container in which an adjustment mechanism of the present invention may be incorporated. Accordingly, in one aspect, the present invention provides the adjustment mechanism, as well as any container with which the adjustment mechanism is incorporated.

Generally, the adjustment mechanism may be both horizontally and vertically adjustable. In the embodiments shown and described herein, the adjustment mechanism includes a base attached to a horizontally and vertically adjustable sidewall. In this manner, an adjustable container having the adjustment mechanism can replace a plurality of pots, pans, cups, plates, or other types of containers, thereby preserving space in a kitchen, a cabinet, a drawer, or another location in which the individual may store containers for preparing, presenting, or consuming foods or beverages. In this manner, the total number of containers needed may be effectively reduced by use of one or more containers of the present invention.

Figure 2:
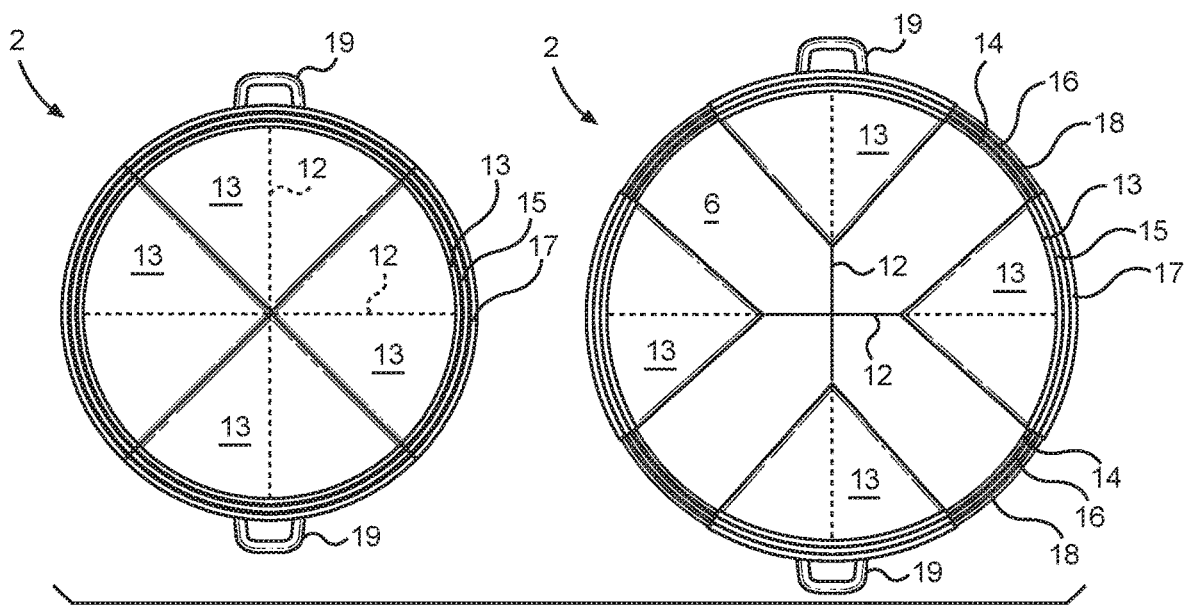
FIG. 2 depicts a top plan view of a horizontal adjustment of a sidewall of an exemplary embodiment of an adjustable container; the adjustable container is shown in retracted (left) and expanded (right) configurations.

Referring now to FIG. 2, there is depicted a top plan view of a horizontal adjustment of a sidewall of an exemplary embodiment of an adjustable container; the adjustable container is shown in retracted (left) and expanded (right) configurations. In the shown embodiment, the exemplary pot 2 is depicted. However, it should be appreciated that the horizontal adjustment mechanism shown, or any variation thereof, can be incorporated into the design or manufacture of any type of container. For the purpose of presenting a clear illustration, the exemplary pot 2 is shown and described throughout.

Figure 5:
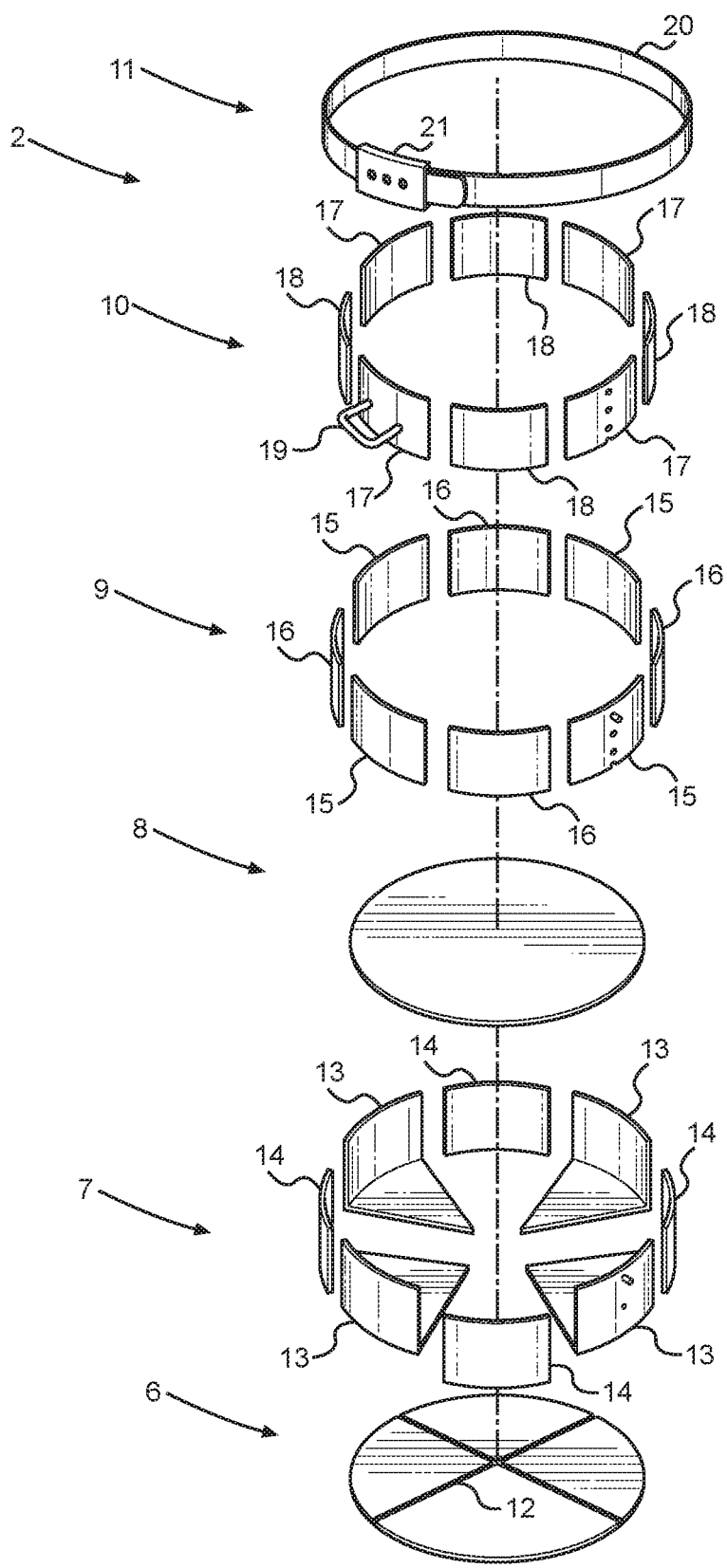
FIG. 5 depicts an exploded view of an exemplary embodiment of an adjustable container.

In the shown embodiment, the exemplary pot 2 is depicted without a base cover, as shown in FIG. 5, in order to portray an exemplary horizontal adjustment mechanism of the exemplary pot 2. The exemplary pot 2 includes a base 6 attached to a horizontally telescopic sidewall. In the shown embodiment, the base 6 includes a groove 12 thereon, arranged in a cross pattern. In this manner, a horizontal movement of a plurality of pocket pieces 13 of an inner section of the sidewall occurs by a sliding movement of the plurality of pocket pieces 13 along the groove 12. The horizontal movement may occur by way of a lip disposed on a bottom surface of each pocket piece of the plurality of pocket pieces 13, such that the lips are configured to slide along corresponding portions of the groove 12 to guide the horizontal movement. In this manner, the base 6 may not rotate or slip relative to the sidewall during the horizontal movement. However, in alternate embodiments, the base 6 does not include the groove 12 thereon, and the lips are also omitted. In this manner, construction of the adjustable container may be facilitated, and internal surfaces of the adjustable container may be smoother or more continuous to reduce the probability of food or beverage residues becoming deposited in the groove 12 during use.

The embodiment depicted shows horizontal adjustment of the sidewall of the exemplary pot 2, which is also vertically adjustable, as described elsewhere herein. In the shown embodiment, the sidewall is comprised of a plurality of insert pieces (14, 16, 18) and a plurality of pocket pieces (13, 15, 17). The plurality of insert pieces (14, 16, 18) is configured to matingly engage with the plurality of pocket pieces (13, 15, 17) in a telescopic assembly, such that the telescopic assembly is expandable and retractable to adjust a circumference of the horizontally telescopic sidewall. In the embodiments shown and described herein, the plurality of insert pieces (14, 16, 18) is configured to engage by a mating arrangement between the insert pieces (14, 16, 18) and the pocket pieces (13, 15, 17). Portions of the insert pieces (14, 16, 18) are configured to insert into pockets of the pocket pieces (13, 15, 17), and in this manner, the mating engagement occurs. In some embodiments, a friction fit may secure the mating engagement in a particular configuration, however, alternate engagements or interactions to adjust the sidewall are envisioned.

The horizontally telescopic sidewall of the exemplary pot 2 is depicted in a retracted (left) and an expanded (right) configuration. To increase the circumference of the sidewall relative to the retracted configuration, the plurality of pocket pieces (13, 15, 17) may be pulled outward, for example, by pulling on one or more handles 19 of the exemplary pot 2. When the plurality of pocket pieces (13, 15, 17) is pulled outward, portions of the plurality of insert pieces (14, 16, 18) emerge from an interior of the plurality of pocket pieces (13, 15, 17), and the expanded configuration is produced. The circumference of the exemplary pot 2 may be secured or fixed by any suitable means, including but not limited to a belt attachable to the sidewall, as described elsewhere herein.

In the shown embodiment, each insert piece of the plurality of insert pieces (14, 16, 18) is an arcuate rectangle configured to matingly engage with each of two pockets adjacent thereto, such that each pocket of the two pockets is a hollow interior of an arcuate rectangle portion of a pocket piece of the plurality of pocket pieces (13, 15, 17). In the shown embodiment, an arcuate rectangle portion of a selection of pocket pieces 13 of the plurality of pocket pieces (13, 15, 17) is attached to a circular sector portion on a lower edge thereof. The selection of pocket pieces 13 is innermost with respect to a radius of the exemplary pot 2, and as such, may be configured to contact the food or beverage placed therein during use.

In the shown embodiment, in the retracted configuration (left), the circular sector portions meet to form a continuous surface upon which a small base cover (not shown) may be placed to seal an interior of the exemplary pot 2. In the expanded configuration (right), the circular sector portions are separated to form a discrete surface upon which a large base cover (not shown) may be placed to seal the interior of the exemplary pot 2. In an intermediate configuration between the retracted configuration and the expanded configuration, the circular sector portions are slightly separated to form the discrete surface, upon which a medium base cover (not shown) may be placed to seal the interior of the exemplary pot 2. Accordingly, the present invention provides a plurality of discretely-sized base covers, which effectively seal the interior of the exemplary pot 2. In various embodiments, each base cover of the plurality of discretely-sized base covers may be used with a particular setting of a suitable means to secure or fix the circumference of the sidewall, for example, by use of a notch in the belt. In this manner, the sidewall does not expand when food or beverage is placed therein, and the interior remains effectively sealed for use.

The circumference is smallest in the retracted configuration (left), largest in the expanded configuration (right), and is a size between the smallest and largest sizes when in the intermediate configuration. In this manner, a horizontal size (e.g., a width, a radius, a diameter) of the exemplary pot 2 may be any of a continuous range of values, and may be sealed and secured at discrete values. The horizontal size of the exemplary pot 2 may be sealed and secured in a small (left), medium, or large (right) size, and a correspondingly-sized base cover may be secured over the innermost pocket pieces 13 (and in some configurations, the base 6) to seal the interior to contain liquids and solids therein during use. In various embodiments, a securing mechanism, such as the belt, may be used to secure the sidewall to the base cover to effectively seal the interior. In this manner, when a significant volume of food or beverage is placed in the exemplary pot 2, a pressure exerted by the food or beverage on the sidewall is countered by a force of the securing mechanism, and the pressure does not horizontally adjust the exemplary pot 2. In this manner, a seal between the base cover and the sidewall may be maintained so as to prevent leakage of food or beverage from the interior of the exemplary pot 2.

Figure 3:
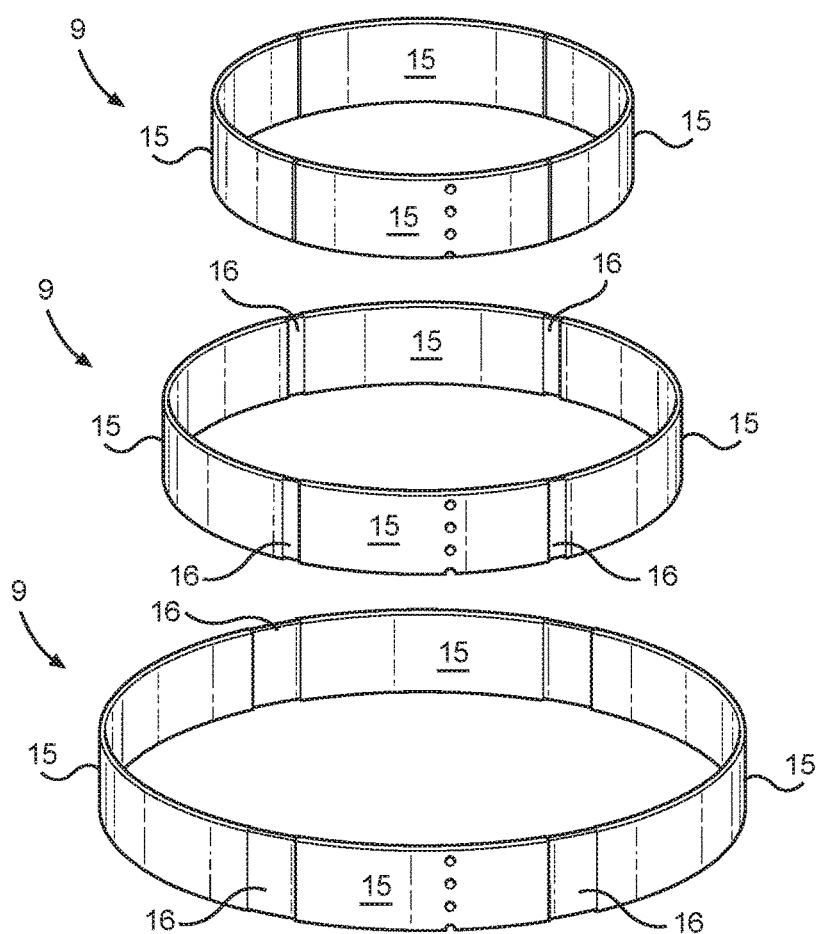
FIG. 3 depicts a side perspective view of a horizontal adjustment of a sidewall of an exemplary embodiment of an adjustable container; the sidewall is shown in retracted (top), partially expanded (middle), and expanded (bottom) configurations.

Referring now to FIG. 3, there is depicted a side perspective view of a horizontal adjustment of a sidewall of an exemplary embodiment of an adjustable container; the sidewall is shown in retracted (top), partially expanded (middle), and expanded (bottom) configurations. In the shown embodiment, an exemplary section 9 of the sidewall, i.e., a middle section having a plurality of insert pieces 16 slidably insertable into a plurality of pocket pieces 15, is portrayed to illustrate an exemplary mechanism for horizontal adjustment of the sidewall.

In the shown embodiment, a circumference of the sidewall is increasable by sliding one or more insert pieces 16 of the sidewall out of one or more pocket pieces 15 of the sidewall (from top to bottom), and the circumference of the sidewall is decreasable by sliding one or more insert pieces 16 of the sidewall into one or more pocket pieces 15 of the sidewall (from bottom to top). In the shown embodiment, the one or more insert pieces 16 includes a plurality of insert pieces 16, and the one or more pocket pieces 15 includes a plurality of pocket pieces 15. The plurality of insert pieces 16 is configured to matingly engage with the plurality of pocket pieces 15 in a telescopic assembly. In this manner, the circumference of the sidewall is easily adjustable, and may be secured at any suitable value as described elsewhere herein.

In the shown embodiment, each insert piece of the plurality of insert pieces 16 is an arcuate rectangle configured to matingly engage with each of two pockets adjacent thereto, such that each pocket of the two pockets is a hollow interior of an arcuate rectangle portion of a pocket piece of the plurality of pocket pieces 15. With regard to the inner section, as depicted in FIG. 2, an arcuate rectangle portion of a selection of pocket pieces 13 of the plurality of pocket pieces (13, 15, 17) is attached to a circular sector portion on a lower edge thereof. However, in the embodiment depicted in FIG. 3, the middle section is shown as the exemplary section 9, and accordingly, the exemplary section 9 does not include the circular sector portion on the lower edges of the pocket pieces of the plurality of pocket pieces 15. In this manner, in the shown embodiments, the inner section includes the circular sector portions, which meet to form the continuous lower surface in the retracted configuration, and which depart to form the discrete lower surface in an expanded configuration. In this manner, the circular sector portions are not included in the design of the middle section and the outer section, but only the inner section. This is because the middle and outer sections do not form a lower surface that serves as a base for supporting the base cover, as described elsewhere herein.

Generally, the exemplary section 9 is illustrative of a mechanism of a horizontally telescopic sidewall for a container. In the shown embodiment, the horizontally telescopic sidewall includes the plurality of insert pieces 16 and the plurality of pocket pieces 15, such that the plurality of insert pieces 16 is configured to matingly engage with the plurality of pocket pieces 15 in a telescopic assembly, and the telescopic assembly is expandable and retractable to adjust a circumference of the horizontally telescopic sidewall.

Figure 4:
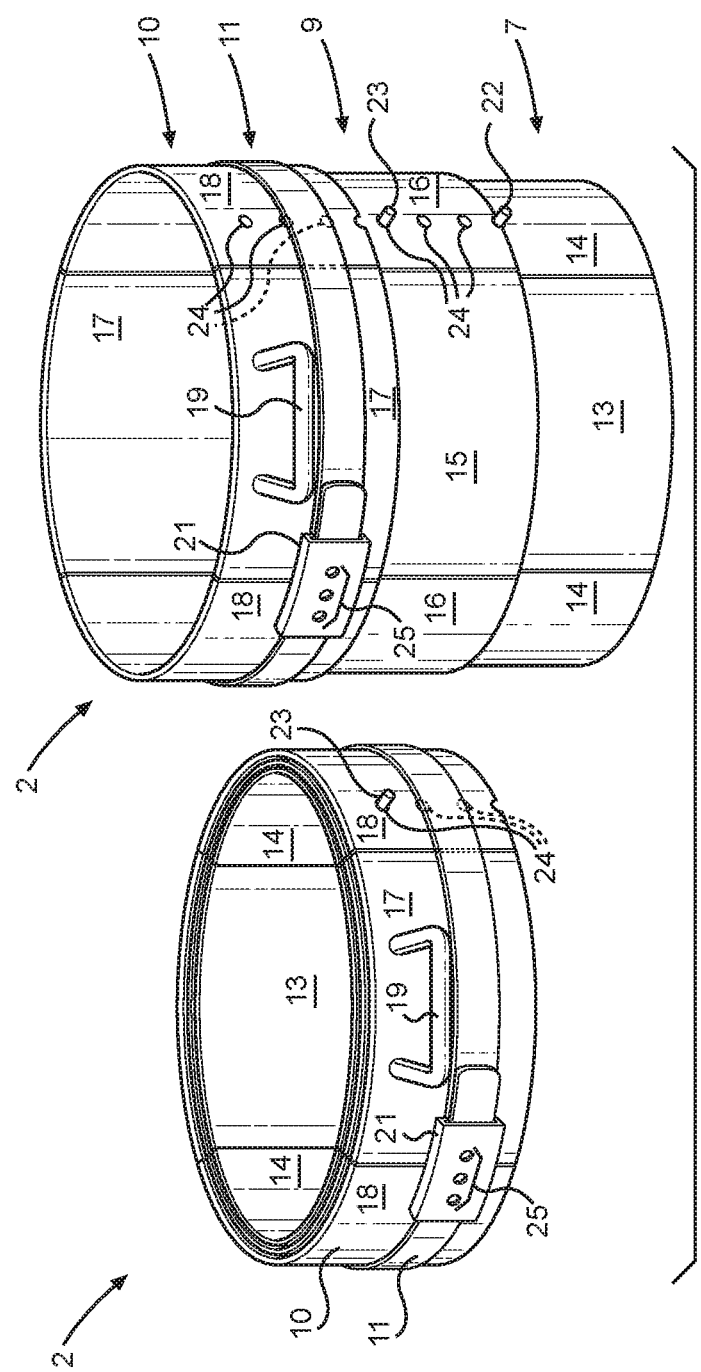
FIG. 4 depicts a side perspective view of a vertical adjustment of an exemplary embodiment of an adjustable container; the adjustable container is shown in retracted (left) and expanded (right) configurations.

Referring now to FIG. 4, there is depicted a side perspective view of a vertical adjustment of an exemplary embodiment of an adjustable container; the adjustable container is shown in retracted (left) and expanded (right) configurations. In various embodiments, the adjustable container (e.g., the exemplary pot 2) includes a circular base and a cylindrical sidewall. In the shown embodiment, a belt 11 is secured to the sidewall, rendering a circumference of the sidewall fixed. In various embodiments, the belt 11 is removable from the sidewall for horizontal adjustment of the circumference of the sidewall. In this manner, the belt 11, or a setting thereof, may be fixed or adjusted to fix or adjust the circumference of the sidewall.

In the shown embodiment, the sidewall includes a pair of locking pins (22, 23) disposed thereon, as well as a plurality of apertures 24. If one or more locking pins (22, 23) is inserted through one or more apertures of the plurality of apertures 24, a height of the sidewall is fixed. If one or more locking pins (22, 23) is not inserted through one or more apertures of the plurality of apertures 24, the height of the sidewall is adjustable. In this manner, the locking pins (22, 23) are sized and configured to be inserted through the plurality of apertures 24 to support a weight of a portion of the sidewall. In this manner, the height of the sidewall may be any of a range of continuous values, and may be secured at any of a plurality of discrete values.

Generally, a height of the sidewall is increasable by sliding one or more sections of a plurality of sections (7, 9, 10) of the sidewall out of one or more sections of the plurality of sections (7, 9, 10) of the sidewall, and the height of the sidewall is decreasable by sliding one or more sections of the plurality of sections (7, 9, 10) of the sidewall into one or more sections of the plurality of sections (7, 9, 10) of the sidewall. In various embodiments, one or more sections of the plurality of sections (7, 9, 10) is configured to slidingly engage with one or more sections of the plurality of sections (7, 9, 10) in a telescopic assembly.

In the shown embodiment, the telescopic assembly is formed of an inner section 7, a middle section 9, and an outer section 10. The inner section 7 is slidably engaged with the middle section 9, and the middle section 9 is slidably engaged with the outer section 10. Upon sliding the middle section 9 upward relative to the inner section 7, the height is increased, and upon sliding the middle section 9 downward relative to the inner section 7, the height is decreased. Further, upon sliding the outer section 10 upward relative to the middle section 9, the height is increased, and upon sliding the outer section 10 downward relative to the middle section 9, the height is decreased. In this manner, a single sliding movement may be made to adjust the height of the sidewall, and this movement may include movement of one or more sections of the plurality of sections (7, 9, 10). In various embodiments, insertion of one or more of the locking pins (22, 23) through one or more one or more apertures of the plurality of apertures 24 secures a vertical position of one or more sections of the plurality of sections (7, 9, 10).

As presented above, in the shown embodiment, each insert piece of the plurality of insert pieces (14, 16, 18) is an arcuate rectangle configured to matingly engage with each of two pockets adjacent thereto, such that each pocket of the two pockets is a hollow interior of an arcuate rectangle portion of a pocket piece of the plurality of pocket pieces (13, 15, 17). In the shown embodiment, the circumference of the exemplary pot 2 is fixed in a horizontally retracted configuration by the belt 11, such as through use of one or more notches 25 on a buckle 21 positioned thereon. In the shown embodiment, the handle 19 is included to facilitate use of the exemplary pot 2.

Generally, an adjustable container of the present invention may be horizontally adjusted independent of a vertical adjustment, or may be vertically adjusted independent of a horizontal adjustment. In various embodiments, through use of both the horizontal and vertical adjustment mechanisms, the adjustable container may be both horizontally and vertically adjusted, as would be understood based on the present disclosure.

Referring now to FIG. 5, there is depicted an exploded view of an exemplary embodiment of an adjustable container. In the shown embodiment, the exemplary pot 2 includes the base 6, the inner section 7, and the base cover 8 which may be any suitable size (e.g., small, medium, or large). In alternate embodiments, the base 6 may be any suitable size (e.g., small, medium, or large), but in exemplary embodiments, the base 6 may be a fixed size. In this manner, during horizontal adjustment of the container, only a differently-sized base cover 8 may be needed to seal the interior of the exemplary pot 2.

In addition, the exemplary pot 2 further includes the middle section 9, the outer section 10, and the belt 11. In the shown embodiment, the vertical broken line depicts a vertical assembly of the components from the exploded view to form an assembled exemplary pot 2. In the shown embodiment, the base 6 includes the groove 12 thereon for guiding a movement of the pocket pieces of the plurality of pocket pieces 13 of the inner section 7. The plurality of insert pieces 14 matingly engage with the plurality of pocket pieces 13. This configuration extends to the other pocket and insert pieces: the plurality of insert pieces 16 matingly engage with the plurality of pocket pieces 15, and the plurality of insert pieces 18 matingly engage with the plurality of pocket pieces 17, as described elsewhere herein. The securement means for fixing the circumference of the exemplary pot 2 includes the belt 11, which includes a strap 20 and a buckle 21 thereon, for adjustment and securement of a section of the sidewall, for example, the outer section 10 which includes the handle 19 thereon. In this manner, the belt 11 may be accessed regardless of a vertical position of the outer section 10 with respect to either of the middle section 9 and the inner section 7.

Accordingly, the present invention provides an adjustable container, having a base attached to a vertically and horizontally adjustable sidewall. In various embodiments, the interior of the adjustable container is effectively sealed such that liquids and solids therein do not leak through cracks or seams between the various parts of the adjustable container. This may be accomplished by any suitable means, including but not limited to particular materials, coatings, or liners that may be used to comprise the various parts or portions thereof. As such, the present invention is not necessarily limited to the exact features set forth herein, and variations in implementing the present invention are contemplated and included.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiments were chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. An adjustable container, comprising:
   a base attached to a vertically and horizontally adjustable sidewall, wherein a width and a height of the sidewall are individually adjustable;
   wherein a shape of the base is circular, and wherein a shape of the sidewall is cylindrical;
   wherein a circumference of the sidewall is increasable by sliding one or more insert pieces of the sidewall out of one or more pocket pieces of the sidewall;
   wherein the circumference of the sidewall is decreasable by sliding one or more insert pieces of the sidewall into one or more pocket pieces of the sidewall;
   wherein the one or more insert pieces includes a plurality of insert pieces;
   wherein the one or more pocket pieces includes a plurality of pocket pieces;
   wherein the plurality of insert pieces is configured to matingly engage with the plurality of pocket pieces in a telescopic assembly;
   wherein each insert piece of the plurality of insert pieces comprises an arcuate rectangle configured to matingly engage with each of two pockets adjacent thereto;
   wherein each pocket of the two pockets is a hollow interior of an arcuate rectangle portion of a pocket pieces of the plurality of pocket pieces;
   wherein an arcuate rectangle portion of a selection of pocket pieces of the plurality of pocket pieces is attached to a circular sector portion on a lower edge thereof.

2. The adjustable container of claim 1, wherein the sidewall is configured to maintain a circumference when a belt is secured thereto, and wherein the sidewall is configured to allow adjustment of the circumference when the belt is not secured thereto.

3. The adjustable container of claim 1, further comprising a locking pin configured to maintain a height of the sidewall when the locking pin is inserted through an aperture in the sidewall, wherein the height of the sidewall is adjustable when the locking pin is not inserted through the aperture in the sidewall.

4. The adjustable container of claim 1, wherein a height of the sidewall is increasable by sliding one or more sections of a plurality of sections of the sidewall out of one or more sections of the plurality of sections of the sidewall, and wherein the height of the sidewall is decreasable by sliding one or more sections of the plurality of sections of the sidewall into one or more sections of the plurality of sections of the sidewall.

5. The adjustable container of claim 4, wherein one or more sections of the plurality of sections is configured to sliding engage with one or more sections of the plurality of sections in a telescopic assembly.

6. The adjustable container of claim 5, wherein the telescopic assembly is formed of an inner section, a middle section, and an outer section; wherein the middle section is slidably engaged with the outer section;

whereupon sliding the middle section upward relative to the inner section the height is increased, and whereupon sliding the middle section downward relative to the inner section the height is decreased;

whereupon sliding the outer section upward relative to the middle section the height in increased, and whereupon sliding the outer section downward relative of the middle section the height is decreased.

7. A horizontally telescopic sidewall, comprising:

a plurality of insert pieces and a plurality of pocket pieces;

wherein the plurality of insert pieces is configured to matingly engage with the plurality of pocket pieces in a telescopic assembly;

wherein the telescopic assembly is expandable and retractable to adjust a circumference of the horizontally telescopic sidewall;

wherein each insert piece of the plurality of insert pieces is an arcuate rectangle configured to matingly engage with each of two pockets adjacent thereto;

wherein each pocket of the two pockets is a hollow interior of an arcuate rectangle portion of a pocket piece of the plurality of pocket pieces;

wherein an arcuate rectangle portion of a selection of pocket pieces of the plurality of pocket pieces is attached to a circular sector portion on a lower edge thereof.

8. The horizontally telescopic sidewall of claim 7, wherein the sidewall is configured to maintain a circumference when a belt is secured thereto, and wherein the sidewall is configured to allow adjustment of the circumference when the belt is not secured thereto.

\* \* \* \* \*